US006121938A

United States Patent [19]

Longshore et al.

[11] Patent Number: 6,121,938

[45] Date of Patent: Sep. 19, 2000

[54] ANTENNA HAVING IMPROVED BLOCKAGE FILL-IN CHARACTERISTICS

[75] Inventors: Theodore F. Longshore, Cary; Clifford Thomas Jones, Raleigh, both of N.C.

[73] Assignee: Ericsson Inc., Research Triangle Park, N.C.

[21] Appl. No.: 08/726,271

[22] Filed: Oct. 4, 1996

[51] Int. Cl.$^{7}$ .................................................... H01Q 19/18

[52] U.S. Cl. ............................................ 343/837; 343/872

[58] Field of Search .................................... 343/836, 837, 343/781 P, 872; H01Q 15/00, 19/00, 19/18

[56] References Cited

U.S. PATENT DOCUMENTS

| | | | |
|---|---|---|---|
| 2,115,788 | 5/1938 | Scharlau | 343/836 |
| 3,815,138 | 6/1974 | Haley . | |
| 4,403,222 | 9/1983 | Bitter, Jr. et al. . | |
| 4,825,222 | 4/1989 | Butcher | 343/836 |
| 5,486,838 | 1/1996 | Dienes | 343/781 P |

FOREIGN PATENT DOCUMENTS

| | | |
|---|---|---|
| 0 251 818 A2 | 3/1987 | European Pat. Off. . |
| 43 31 906 A1 | 3/1995 | European Pat. Off. . |
| 60-144029 | 7/1985 | Japan . |
| 7-154320 | 6/1995 | Japan . |
| 2 275 133 | 8/1994 | United Kingdom . |

*Primary Examiner*—Michael C. Wimer
*Attorney, Agent, or Firm*—Jenkens & Gilchrist, P.C.

[57] ABSTRACT

An apparatus for limiting shadowing of RF coverage areas around antennas and closely associated equipment housings is disclosed. The equipment housing and antenna are located in close proximately such that the RF coverage area of the antenna is partially shadowed due to signal blockage by a face of the equipment housing or other structure. The shadowed RF coverage area is eliminated or substantially reduced by placement of a reflector to reflect emitted signals from the antenna into the shadowed RF coverage area.

17 Claims, 3 Drawing Sheets

30 14 28b 22b 22a 12 16 Shadow Width 25b 25a 10 28a 26

12
14
14
β
16
10

12
16
β
a
c
b
10
20
18
20

12
14
16
22a
22b
25a
25b
26
28a
28b
10
30
Shadow Width

ANTENNA HAVING IMPROVED BLOCKAGE FILL-IN CHARACTERISTICS

BACKGROUND OF THE INVENTION

1. Technical Field of the Invention

The present invention relates to the RF coverage areas of antennas, and more particularly, to the improvement of RF coverage about antennas with coverage areas partially shielded by an equipment housing.

2. Description of Related Art

The use of microcellular network coverage areas involves the placement of antennas in areas providing limited RF propagation characteristics. The use of microcells permit better coverage over particularly high traffic areas within a cellular network. Presently existing configurations of antennas and base station equipment are connected to each other by coaxial cables. However, this configuration is being replaced by integrated antenna and equipment housing configurations. Combination of the antenna with the equipment housing minimizes installation requirements. However, this solution raises the problem of RF signal blocking caused by the equipment housing being located next to the antenna.

Placement of the antenna in close proximately to the equipment housing creates a shadow in the RF coverage area of the antenna. The shadow is caused by the equipment housing blocking all signals from propagating in the direction of the housing. This degrades or eliminates RF coverage in the direction of the housing. One solution to this problem has been to place the antenna above or below the housing in order to provide omnidirectional coverage. While this approach is physically simple to implement, it is aesthetically offensive and does not work well with indoor applications where the antenna and housing configuration is easily visible.

Another type of indoor application in microcellular networks uses microstrip patch antennas. These types of antennas are completely adequate when placed against a wall but are unsuitable for placement in the center of a room or large open area. The unsuitability arises from the limited coverage area of microstrip patch antennas, which only provide a 90° beamwidth. Thus, there is a need in microcell applications for an antenna and equipment housing configuration enabling omnidirectional RF coverage patterns about the antenna with limited or no blind spots within the coverage.

SUMMARY OF THE INVENTION

The present invention overcomes the foregoing and other problems with an integrated antenna package providing RF blockage fill-in capabilities. The base station configuration of the present invention consists of an equipment housing for containing receiver, transmitter, and controlling equipment, and an antenna integrated with the equipment housing to provide RF coverage to an area around the antenna. The antenna and equipment housing are connected in such a manner that the equipment housing shields a part of area surrounding the antenna from RF coverage, thus, preventing omnidirectional coverage about the antenna.

Associated with the antenna and equipment housing package is a means for reflecting emissions from the antenna into the area blocked from RF coverage by the equipment housing. This enables RF coverage to be provided to substantially all of the area surrounding the antenna. In one embodiment, the means for reflecting comprises an RF transparent radome surrounding the antenna having reflectors mounted within the inner surface of the radome for reflecting antenna emissions past the equipment housing and into the shadowed RF coverage area.

In a second embodiment, a pair of elliptical reflectors are mounted on opposite sides of the antenna, and the antenna is located at the focus of the ellipse formed between the elliptical reflectors. This configuration causes any emissions from the antenna incident on the reflectors to be reflected from the elliptical reflectors through the other focus of the ellipse and into the shadowed RF coverage area. This reflection scheme, however, leaves a shadow within the RF coverage area equal to the width of the equipment housing.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1:
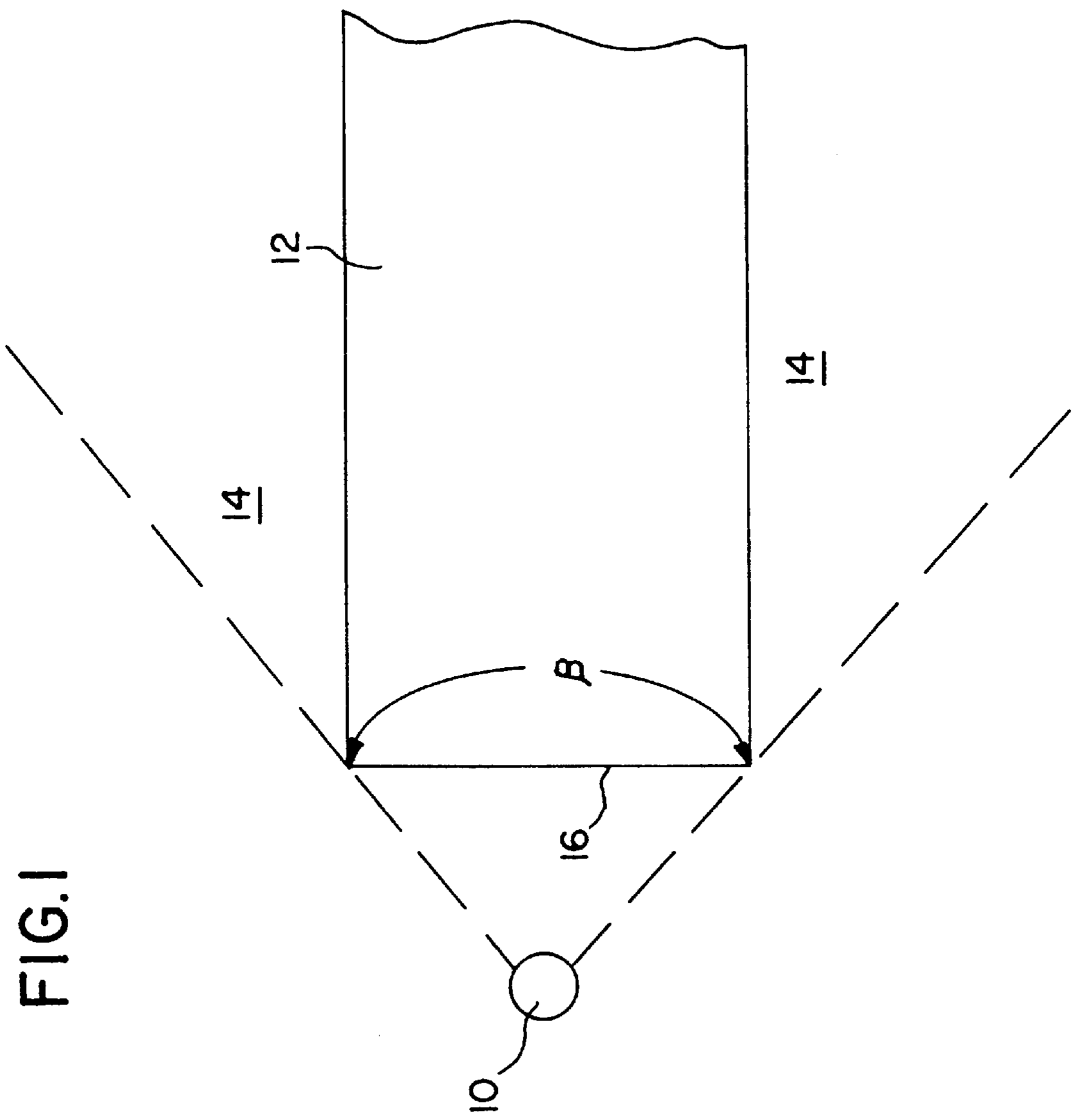
FIG. 1 illustrates the RF coverage blocking problem causes by the location of an antenna in close proximately to an equipment housing.

Referring now to the drawings, and more particularly to FIG. 1, there is illustrated the problem created by location of an antenna in close proximity to the equipment housing of a base station. As can be seen from the figure, placement of the antenna 10 in close proximity to the base station housing 12 creates a shadowed RF coverage area 14 that greatly limits the RF coverage area of an antenna. The signal shadow 14 can block antenna effectiveness over large areas of a cell coverage area rendering the antenna ineffective and dramatically reducing the actual cell coverage. This problem is most dramatic when the base station equipment housing 12 and the antenna 10 occupy the same horizontal plane, and the spatial separation between the antenna and housing is on the same order as the dimension of face 16 of the base station equipment housing facing the antenna. Depending upon the distance of the antenna 10 from the equipment housing 12 blocking of the RF coverage can be as much as 180°. Also, while the blockage is described above and in the following description as being caused by the base station housing 12, any structure associated with the antenna could create a shadowed area that the following embodiments would be useful in decreasing or eliminating.

Figure 2:
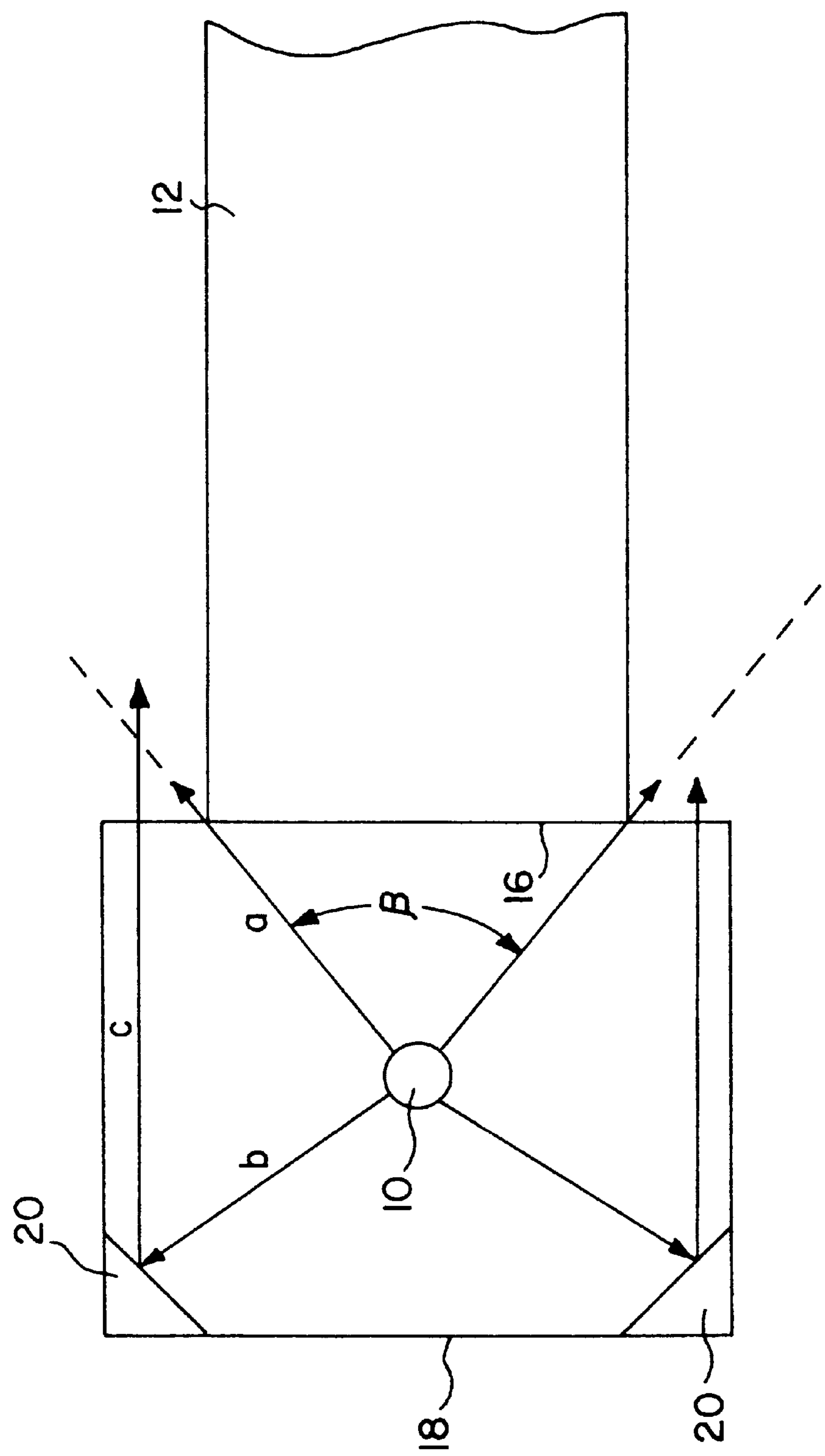
FIG. 2 illustrates a first embodiment of the invention for an antenna using a pair of reflectors located on the interior of an antenna radome.

Referring now to FIG. 2, there is illustrated a first embodiment of an antenna 10 and housing 12 configuration having blockage fill-in characteristics. The configuration include the equipment housing 12 enclosing the base station transmitting, receiving, and controlling equipment and an antenna 10 associated with the housing. Surrounding the antenna 10 is an RF transparent radome 18 through which RF signals easily pass. As discussed in FIG. 1, the face 16 of the equipment housing 12 blocks the RF coverage around the antenna creating a shadowed RF coverage area 14 at an angle having size $\beta$.

The shadowed RF coverage area 14 is combatted by adding a pair of rectangular reflectors 20 to the interior surface of the radome 18 to reflect RF emissions from the antenna 10 into the shadowed RF coverage area 14. This enables omnidirectional RF coverage around the antenna 10.

Ideally, the reflectors 20 have a parabolic cross section with their focus located at the antenna 10. However, a circular or even flat reflector should provide nearly equivalent performance characteristics. In the event the antenna has no radome 18, any supporting structure for the reflectors 20 would be useful for purposes of the present invention.

The size of the reflectors 20 must be such that the reflected energy is equivalent to the energy required to fill the gap in the RF coverage area. Thus, as shown in FIG. 2 if the equipment subtends at an angle $\beta$ when viewed from the antenna, each reflector 20 should also subtend an angle slightly less than $\beta/2$ to provide the necessary fill-in energy. The reflector 20 must be positioned such that $b+c=a+n\lambda+\lambda/2$ (where n=an integer greater than 0 and $\lambda$=the wavelength of the emission from the antenna 10) to provide a uniform phase front at the antenna aperture.

Figure 3:
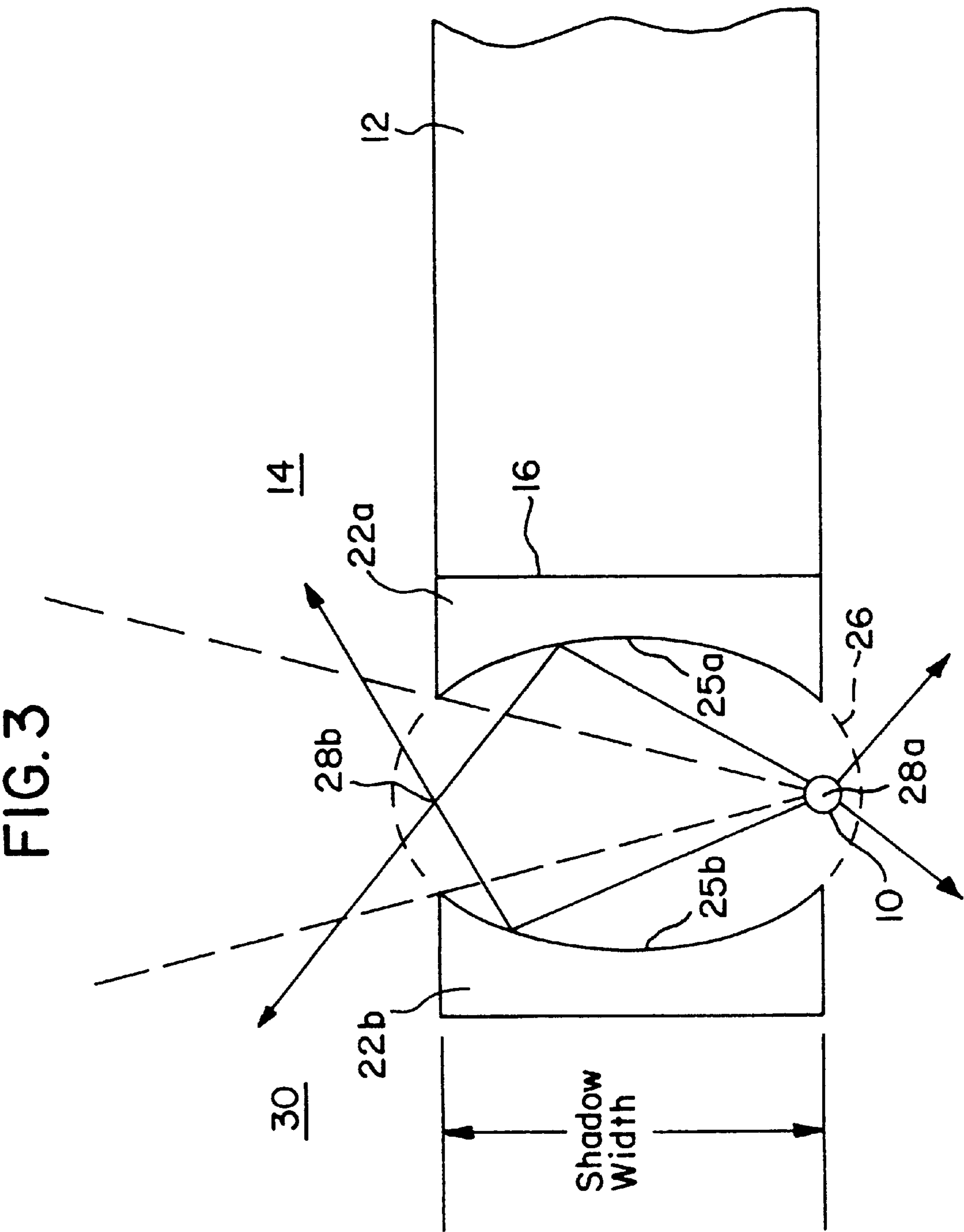
FIG. 3 illustrates a second embodiment of the invention for an antenna utilizing a pair of opposed elliptical reflectors.

Referring now to FIG. 3, there is illustrated a second embodiment of the present invention utilizing a pair of opposed elliptical reflectors 22*a*, 22*b*. As before, the antenna 10 is located in close proximity to the equipment housing 12 such that a shadowed RF coverage area 14 is created. A pair of opposed elliptical reflectors 22 are placed such that a first reflector 22*a* is placed on the face 16 of the equipment housing 12 with an elliptical surface 25*a* facing outward toward the antenna 10. A second elliptical reflector 22*b* is placed on the opposite side of the antenna 10 such that the elliptical surface 25*b* faces the elliptical surface 25*a* of reflector 22*a*. The width of the elliptical reflectors 22*a*, 22*b* correspond to the width of the equipment house 12. While not illustrated in FIG. 3, the embodiment may also be enclosed in a radome to protect the antenna components.

The surfaces 25*a*, 25*b* of the elliptical reflectors 22*a*, 22*b* are coincident with the surface of an ellipse 26 (shown in phantom in FIG. 3) having foci 28*a* and 28*b* separated by a distance equal to the width of the equipment housing 12. The antenna 10 is located on one of the focus of the ellipse 26. By locating the antenna 10 and the elliptical reflectors 22*a*, 22*b* in this manner, the reflectors are able to redistribute the emission of the antenna over the shadowed RF coverage area 14 created by the base station housing 12. Note that reflector 22*b* which fills the shadowed RF coverage area 14 created by the equipment housing 12 also a creates shadowed RF coverage area 30 of its own. However, the elliptical reflector 22*a* fills the shadowed RF area created by the elliptical reflector 22*b* to limit any additional blockage caused by the reflector 22*a*. The reflection pattern only leaves a shadow on each side of the housing 12 equal to the width of the equipment housing. The shadow edges are parallel to the equipment housing 12 and do not increase with distance from the housing. Alternatively, simplified circular reflectors could be used in place of elliptical reflectors for configurations when the ellipse 26 is nearly a circle.

The elliptical reflectors 22*a*, 22*b* work under the following principle. A signal originating at one focus 28*a* (the antenna 10) is reflected off of the elliptical surface 22*a*, 22*b* of the reflectors 22*a*, 22*b* and passes through the other focus 28*b* of the ellipse 26. This causes the reflected signal to pass into one of the two shadowed RF coverage areas 14, 30. In order for the phase of the reflected signal to match that of the unreflected signal, the difference in the lengths of the two signal paths, $\Delta$, must satisfy the following expression, where $\lambda$ is wavelength, and n is an integer greater than or equal to 0.

$$\Delta=\lambda(n+\tfrac{1}{2})$$

The reflected signal path will satisfy the expression for $\Delta$, when the major axis of the ellipse 26 equals to $\Delta$. By following these conditions a virtual antenna is created at the opposite focus 28*b* of the ellipse 26 that covers the shadowed RF area 14 and 30.

Although an embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A system for providing omnidirectional RF coverage, comprising:

an antenna for providing RF coverage to an area associated with the antenna, wherein a structure associated with the antenna shields a first area from the antenna preventing RF coverage in the first area;

a first elliptical reflector located on a first side of the antenna to reflect emissions from the antenna into the first area, the first elliptical reflector shielding a second area from RF coverage;

a second elliptical reflector located on a second side of the antenna, opposite the first reflector for reflecting emissions from the antenna into the second area; and wherein the first and the second elliptical reflectors are spaced apart such that their surfaces correspond to an ellipse between the first and the second reflectors and a distance between foci of the ellipse corresponds to the width of the structure shielding the first area.

2. The system of claim 1, further including a radome surrounding the antenna.

3. The system of claim 2, wherein the first and second elliptical reflectors are positioned on an interior surface of the radome.

4. The system of claim 1 wherein the first and second elliptical reflectors have a size such that energy reflected by the first and second elliptical reflectors are substantially equivalent to energy required to fill the first area.

5. The system of claim 1 wherein the first and second elliptical reflectors are positioned to provide a uniform wave front at an antenna aperture.

6. The system of claim 1 wherein the antenna is located at a focus of the ellipse.

7. The system of claim 1 wherein the first and the second elliptical reflectors are spaced apart such that their surfaces are approximated by a surface having a circular shape.

8. A system for providing omnidirectional RF coverage from an antenna having an RF coverage area partially shielded by a blocking structure, comprising:

a supporting structure associated with the antenna;

a first elliptical reflector positioned on the supporting structure and located on a first side of the antenna to reflect RF emissions from the antenna into a first shielded RF coverage area;

a second elliptical reflector positioned on the supporting structure and located on a second side of the antenna to reflect RF emissions from the antenna into a second shielded RF coverage area; and wherein the first and second elliptical reflectors provide omnidirectional RF coverage about the antenna and the blocking structure.

9. The system of claim 8 wherein the elliptical reflectors have a size such that energy reflected by the reflectors is substantially equivalent to energy required to fill the shielded RF coverage area.

10. The system of claim 8 wherein the reflectors are positioned to provide a uniform wave front at the antenna aperture.

11. The system of claim 8 wherein the supporting structure comprises a radome.

12. The apparatus of claim 8 wherein the first and the second elliptical reflectors are spaced apart such that their surfaces correspond to an ellipse between the two reflectors.

13. The apparatus of claim 8 wherein a distance between foci of the ellipse corresponds to the width of an equipment housing.

14. The apparatus of claim 8 wherein the antenna is located at a focus of the ellipse.

15. The system of claim 8 wherein the first and the second elliptical reflectors are spaced apart such that their surfaces are approximated by a surface having a circular shape.

16. A system for providing omnidirectional RF coverage comprising:

an antenna for providing RF coverage to an area associated with the antenna, wherein a structure associated with the antenna shields a first area from the antenna preventing RF coverage in the first area;

a first simplified circular reflector located on a first side of the antenna to reflect emissions from the antenna into the first area, the first simplified circular reflector shielding a second area from RF coverage; and a second simplified circular reflector located on a second side of the antenna opposite the first reflector for reflecting emissions from the antenna into the second area, wherein the spacing of the second reflector from the first reflector is such that surfaces of the first and second circular reflectors are approximated by a surface having a circular shape.

17. A system for providing omnidirectional RF coverage, comprising:

an antenna for providing omnidirectional RF coverage to an area associated with the antenna, wherein a structure associated with the antenna shields a first area from the antenna preventing omnidirectional RF coverage from the antenna;

a first simplified circular reflector located on a first side of the antenna to reflect emissions from the antenna into a first shielded RF coverage area;

a second simplified circular reflector located on a second side of the antenna to reflect emissions from the antenna into a second shielded RF coverage area, wherein the first and the second reflectors are spaced apart such that their surfaces are approximated by a surface having a circular shape.

* * * * *